United States Patent [19]
Azuma

[11] Patent Number: 5,008,880
[45] Date of Patent: Apr. 16, 1991

[54] DATA TRANSMISSION APPARATUS

[75] Inventor: Daisuke Azuma, Nara, Japan

[73] Assignee: Sharp Kabushiki Kaisha, Osaka, Japan

[21] Appl. No.: 323,021

[22] Filed: Mar. 14, 1989

[30] Foreign Application Priority Data

Mar. 14, 1988 [JP] Japan .................................. 63-61587
Mar. 14, 1988 [JP] Japan .................................. 63-61588

[51] Int. Cl.⁵ .......................................... H04J 3/26
[52] U.S. Cl. .................................. 370/85.6; 370/94.1
[58] Field of Search ..................... 370/94.1, 58.21, 60, 370/85.6

[56] References Cited

U.S. PATENT DOCUMENTS 4,709,364 11/1987 Hasegawa et al. ................. 370/85.6
4,739,323 4/1988 Miesterfeld ........................ 370/85.2
4,864,560 9/1989 Quinquis et al. ................... 370/85.6
4,866,702 9/1989 Shimizu .............................. 370/85.6

Primary Examiner—Douglas W. Olms
Assistant Examiner—Melvin Marcelo

[57] ABSTRACT

A data transmission apparatus comprises a plurality of first data transmission paths, a second data transmission path, and an arbitration control portion. Priorities are respectively given to the plurality of first data transmission paths. A plurality of first data transmission paths receive a plurality of data applied through a plurality of input-side data transmission paths. When the plurality of data stay in the input-side data transmission paths, the arbitration control portion performs control such that data is transmitted from a first data transmission path having the higher priority to the second data transmission path.

20 Claims, 7 Drawing Sheets

DATA TRANSMISSION APPARATUS

BACKGROUND OF THE INVENTION

1. Field of the Invention

The present invention relates generally to data transmission apparatuses, and more particularly, to a data transmission apparatus for sending out in series transmitted data.

2. Description of the Background Art

In a processor such as an electronic computer, a plurality of processing units are coupled through communication by digital signals. A plurality of data processing are performed by a plurality of processing units in a distributed manner. In this case, the result obtained in each of the processing units is sent to a second processing unit different from the plurality of processing units. In this second processing unit, data processing is performed using the plurality of received results of processing. Such an apparatus is disclosed in, for example, Japanese Patent Laying-Open Gazette No. 17543/1986.

The time required for processing data in the above described respective processing units differ depending on received data and the contents of processing required of the processing units. In addition, groups of data processed in the respective processing units are not always transmitted in the same order and at the same time intervals. Therefore, a stay of a group of data can be made from variations in processing time in the second processing unit. If a transmission path itself can have a buffer function of decreasing such a stay of the group of data to the utmost, the amount of hardwears of a data processing apparatus can be decreased.

SUMMARY OF THE INVENTION

An object of the present invention is to provide a data transmission apparatus capable of receiving data transmitted through a plurality of input-side or incoming transmission paths to the limit of capacity of each of the transmission paths, capable of transmitting a plurality of received data to an output-side or outcoming transmission path in the order of arrival, and capable of transmitting to the output-side transmission path by priority data in an input-side transmission path having the higher priority out of input-side transmission paths when a plurality of data stay in the input-side transmission paths.

Another object of the present invention is to provide a data transmission apparatus capable of receiving packet data comprising a plurality of words transmitted through a plurality of parallel input-side transmission paths to the limit of capacity of each of the transmission paths, capable of transmitting received packet data to an output-side transmission path in the order of arrival, and capable of transmitting to an output-side transmission path by priority packet data in an input-side transmission path having the higher priority out of input-side transmission paths in units of packet data when a plurality of packet data stay in the input-side transmission paths.

In order to attain the above described objects, the data transmission apparatus according to the present invention comprises a plurality of first data transmission paths, a second data transmission path and control means.

Priorities are respectively given to the plurality of first data transmission paths. More specifically, the plurality of first data transmission paths are weighted. The second data transmission path selectively receives data from any one of the plurality of first data transmission paths. The control means performs control, when any one of the plurality of first data transmission paths receives data, such that the data in the first data transmission path is transmitted to the second data transmission path while performing control, when any data transmission paths of the plurality of first data transmission paths simultaneously receive data, such that data in a data transmission path having the higher priority is transmitted to the second data transmission path.

In the data transmission apparatus according to the present invention, continuous data can be inputted to each of a plurality of input-side transmission paths at arbitrary time intervals more than time intervals peculiar to each of the transmission paths. In addition, when a group of data is inputted to a plurality of input-side transmission paths, data of the group of data can be inputted to each of the transmission paths with arbitrary time deviation more than constant time deviation. The data can be received to the limit of physical capacity of each of the transmission paths.

Data received by input-side transmission paths can be transmitted to an output-side transmission path in the order of arrival. On the other hand, when data stay in input-side transmission paths, data in a desired transmission path can be transmitted to an output-side transmission path in series such that the stay of the data in the transmission path is decreased by priority.

Thus, data can be sequentially transmitted to an output side transmission path within transfer time peculiar to the transmission path without delay time for arbitration.

As described in the foregoing, according to the present invention, even if a plurality of data are transmitted through a plurality of transmission paths at arbitrary time intervals and asynchronously, the data can be transmitted to an output-side transmission path without delay time for arbitration.

In accordance with another aspect of the present invention, each of data is a packet data comprising a plurality of words continuously transmitted, and control means performs control for transmission in units of packet data.

In the data transmission apparatus according to the present invention, continuous packet data can be inputted to each of a plurality of parallel input-side transmission paths at arbitrary time intervals more than time intervals peculiar to the transmission path. In addition, when a group of packet data is inputted to a plurality of parallel input-side transmission paths, packet data of the group of packet data can be inputted to each of the transmission paths with arbitrary time deviation more than constant time deviation. The packet data can be received to the limit of physical capacity of each of the transmission paths.

Packet data received by input-side transmission paths can be transmitted to an output-side transmission path in the order of arrival. On the other hand, when packet data stay in input-side transmission paths, packet data in a desired transmission path can be transmitted to an output-side transmission path in series such that the stay of the packet data in the transmission path is decreased by priority.

Thus, packet data can be sequentially transmitted to an output-side transmission path within transfer time peculiar to the transmission path without delay time for arbitration.

As described in the forgoing, according to the present invention, even if a plurality of packet data are transmitted through a plurality of transmission paths at arbitrary time intervals and asynchronously, the packet data can be transmitted to an output-side transmission path without delay time for arbitration.

Thus, high-speed transmission of data or packet data and a reliable arbitrating mechanism can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
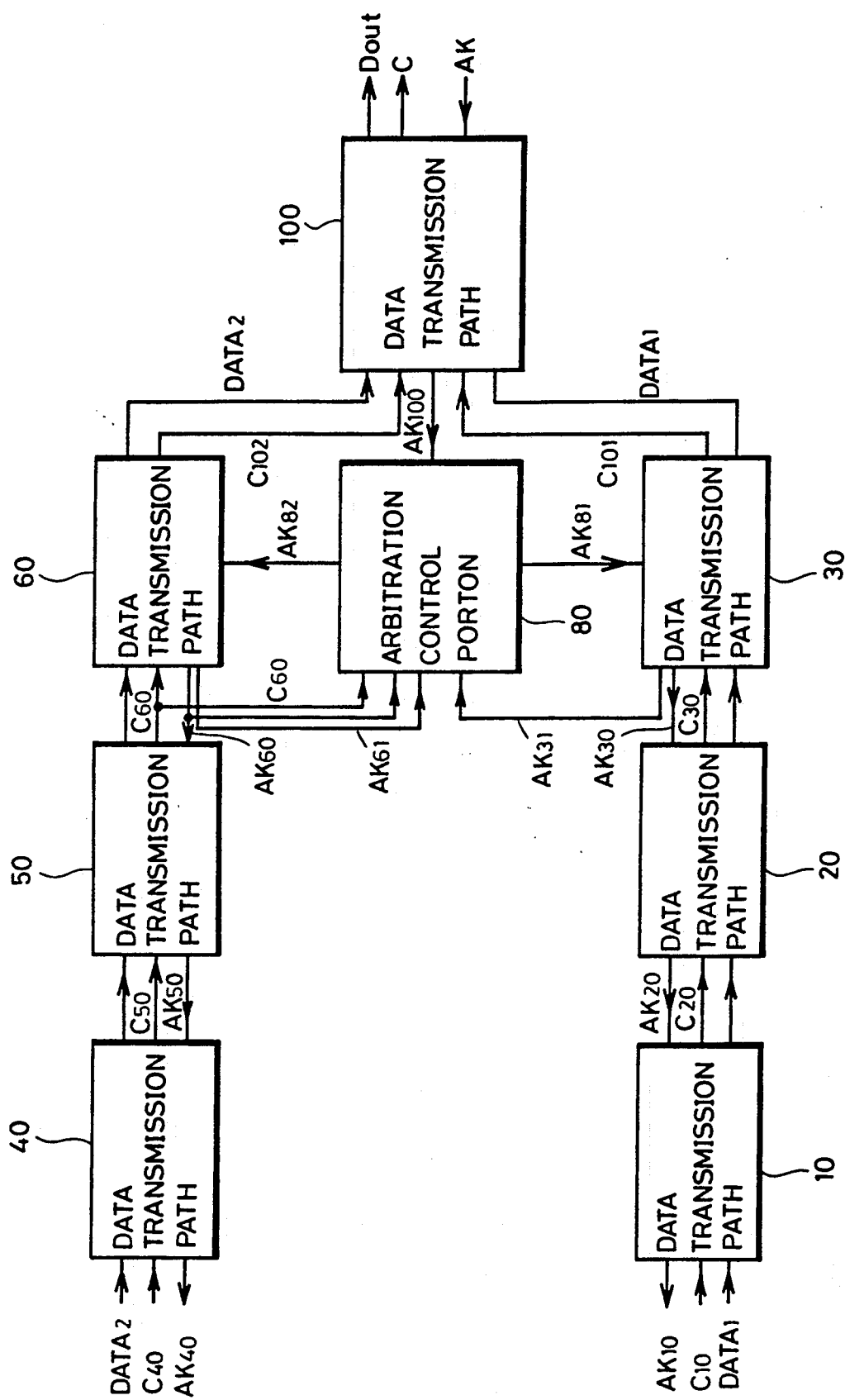
FIG. 1 is a block diagram showing a structure of a data transmission apparatus according to an embodiment of the present invention.

Referring now to the drawings, embodiments of the present invention will be described in detail.

FIG. 1 is a block diagram showing a structure of a data transmission apparatus according to an embodiment of the present invention.

In FIG. 1, there are provided in an input-side transmission path comprising data transmission paths 10, 20 and 30 and an input-side transmission path comprising data transmission paths 40, 50 and 60. In the drawing the paths formed by 10, 20 and 30 and 40, 50 and 60 are shown side by side and physicallyparallel to each other. A data transmission path 100 is included in an output-side transmission path. An arbitration control portion 80 is responsive to a transmission authorizing signal from the data transmission path 100 for arbitrating the order of output of data from the input-side transmission paths such that the data in the input-side transmission paths are transmitted to the data transmission path 100 in the order of arrival or in the order of priority. Meanwhile, in the present embodiment, one word data comprising n bits is transmitted.

In the initial state, the data transmission path 100 is in a state in which data can be received. In this state, a transmission authorizing signal AK100 indicating that data can be received is applied to the arbitration control portion 80 from the data transmission path 100. The arbitration control portion 80 is responsive to the transmission authorizing signal AK100 for applying a transmission authorizing signal AK81 to the data transmission path 30 or a transmission authorizing signal AK82 to the data transmission path 60. Either one of the data transmission paths 30 and 60 is only authorized to transmit data to the data transmission path 100 using the transmission authorizing signal AK81 or AK82. In this embodiment, the data transmission path 60 is given higher priority over the data transmission path 30.

Consider a case in which the data transmission path 60 is authorized to transmit data to the data transmission path 100 while the data transmission path 30 is inhibited from transmitting data to the data transmission path 100.

First, a transmission signal C10 is applied to the data transmission path 10, so that data 1 arrives at the data transmission path 10. When a transmission authorizing signal AK20 from the data transmission path 20 is in a state in which transmission is authorized, the data transmission path 10 applies a transmission signal C20 to the data transmission path 20, to transmit the data 1. In the same manner, the data 1 is transmitted to the data transmission path 30 from the data transmission path 20.

Until the data transmission path 10 receives the data 1 and the transmission signal C10, a transmission authorizing signal AK10 is in a transmission authorized state. However, when the data transmission path 10 receives the data 1 and the transmission signal C10, the transmission authorizing signal AK 10 enters a state in which the next data and the next transmission signal are inhibited from being inputted. More specifically, the transmission authorizing signal AK10 becomes a signal for informing that the data transmission path 10 is receiving data.

When there is no data in the data transmission path 60, the arbitration control portion 80 authorizes the data transmission path 30 to transmit data to the data transmission path 100 using the transmission authorizing signal AK81, and inhibits the data transmission path 60 from transmitting data to the data transmission path 100. Since the data transmission path 30 is authorized to transmit data to the data transmission path 100, the data 1 is transmitted to the data transmission path 100. When the data 1 passes through the data transmission path 100, the transmission authorizing signal AK100 for authorizing data transmission is applied to the arbitration control portion 80 from the data transmission path 100. Consequently, the arbitration control portion 80 applies the transmission authorizing signal AK81 for authorizing data transmission to the data transmission path 30. On this occasion, the data transmission path 60 remains inhibited from transmitting data, which is waiting until data transmission is authorized.

Then, data 2 arrives at the data transmission path 40. In the same manner, the data 2 is transmitted to the data transmission path 60 through the data transmission path 50. When it is confirmed using a transmission authorizing signal AK31 from the data transmission path 30 that no data exists in the data transmission path 30, the arbitration control portion 80 authorizes the data transmission path 60 to transmit data to the data transmission path 100 using the transmission authorizing signal AK82, and inhibits the data transmission path 30 from transmitting data to the data transmission path 100.

Since the data transmission path 60 is authorized to transmit data to the data transmission path 100, the data 2 is transmitted to the data transmission path 100. When the data 2 passes through the data transmission path 100, the transmission authorizing signal AK100 for authorizing data transmission is applied to the arbitration control portion 80 from the data transmission path 100. Consequently, the arbitration control portion 80 applies again to the data transmission path 60 the transmission authorizing signal AK82 for authorizing data transmission.

Then, it is assumed that the data 2 is inputted a little later, as compared with the data 1.

When the data 1 arrives at the data transmission path 10, the data 1 is transmitted to the data transmission path 30 through the data transmission path 20. In addition, transmission signals C10, C20 and C30 are sequentially applied to the data transmission path 10 from the data transmission path 30. On this occasion, the transmission authorizing signal AK31 is applied to the arbitration control portion 80 from the data transmission path 30. Consequently, the arbitration control portion 80 inhibits the data transmission path 60 from transmitting data to the data transmission path 100. When the data 2 arrives at the data transmission path 40, the data 2 is transmitted to the data transmission path 60 through the data transmission path 50, where the data 2 is temporarily stopped. When the data 1 passes through the data transmission pat 30, data transmission from the data transmission path 60 to the data transmission path 100 is authorized.

Thus, the arbitration control portion 80 arbitrates input-side transmission paths such that data late in arriving out of the data 1 and 2 is temporarily stopped in the data transmission path 30 or 60.

Then, it is assumed that a plurality of data stay in both input-side transmission paths.

In the embodiment shown in FIG. 1, data transmission from the data transmission path 60 to the data transmission path 100 is given priority over data transmission from the data transmission path 30 to the data transmission path 100. Therefore, the arbitration control portion 80 authorizes the data transmission path 60 to transmit data to the data transmission path 100 and inhibits the data transmission path 30 from transmitting data to the data transmission path 100 until the stay of data in the data transmission path 60 is decreased.

The data staying state is determined by the transmission authorizing signals AD31 and AK61 inputted to the arbitration control portion 80. The transmission authorizing signals AK31 and AK61 are respectively inverted signals of transmission authorizing signals AK30 and AK60. In addition, the order of priority of data transmission paths is determined by a transmission signal C60.

Figure 2:
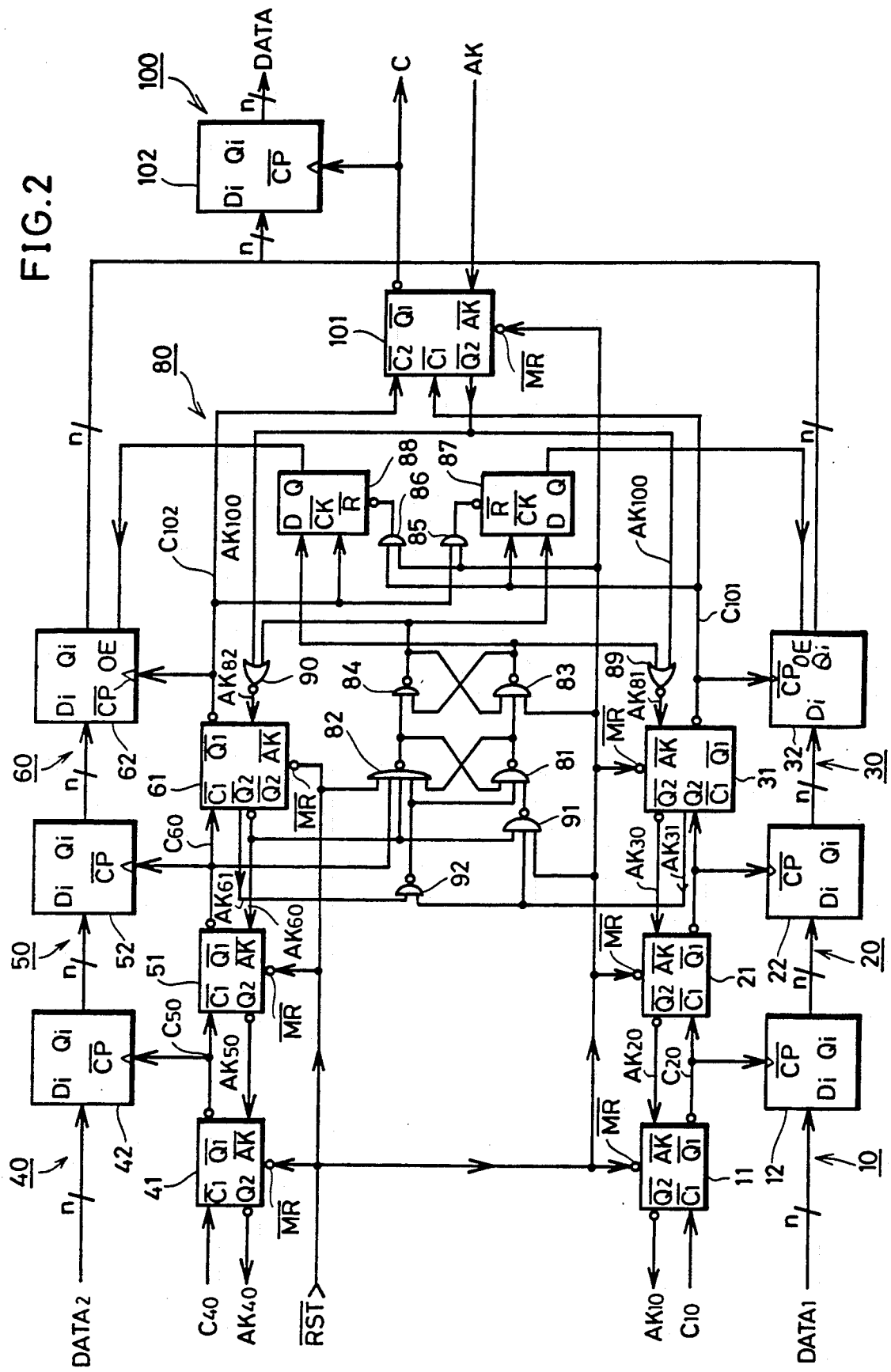
FIG. 2 is a specific circuit diagram of the data transmission apparatus shown in FIG. 1.

FIG. 2 is a specific circuit diagram of the data transmission apparatus shown in FIG. 1.

A data transmission path 10 comprises a transmission control portion 11 and a data holding circuit 12. Similarly, data transmission paths 20, 30, 40, 50 and 60 respectively comprise a transfer control portion 21 and a data holding circuit 22, a transfer control portion 31 and a data holding circuit 32, a transfer control portion 41 and a data holding circuit 2, a transfer control portion 51 and a data holding circuit 52, and a transfer control portion 61 and a data holding circuit 62. In addition, a data transmission path 100 comprises a transfer control portion 101 and a data holding circuit 102.

Each of the transfer control portions 11, 21, 31, 41, 51 and 61 has a transmission signal input terminal $\overline{CI}$, a transmission authorizing signal input terminal $\overline{AK}$, a transmission signal output terminal $\overline{Q1}$, and a transmission authorizing signal output terminal $\overline{Q2}$, which performs handshaking transfer control. In addition, the transfer control portion 101, which has two transmission signal input terminals $\overline{C1}$ and $\overline{Q2}$, contains a function of ORing inputted two different transmission signals, This transfer control portion 101 performs handshaking transfer control, similarly to the transfer control portions 11, 21, 31, 41, 51 and 61.

An arbitration control portion 80 comprises NAND gates 81 to 84, 91 and 92, AND gates 85 and 86, D-type flip-flop 87 and 88, and NOR gates 89 and 90.

Figure 3:
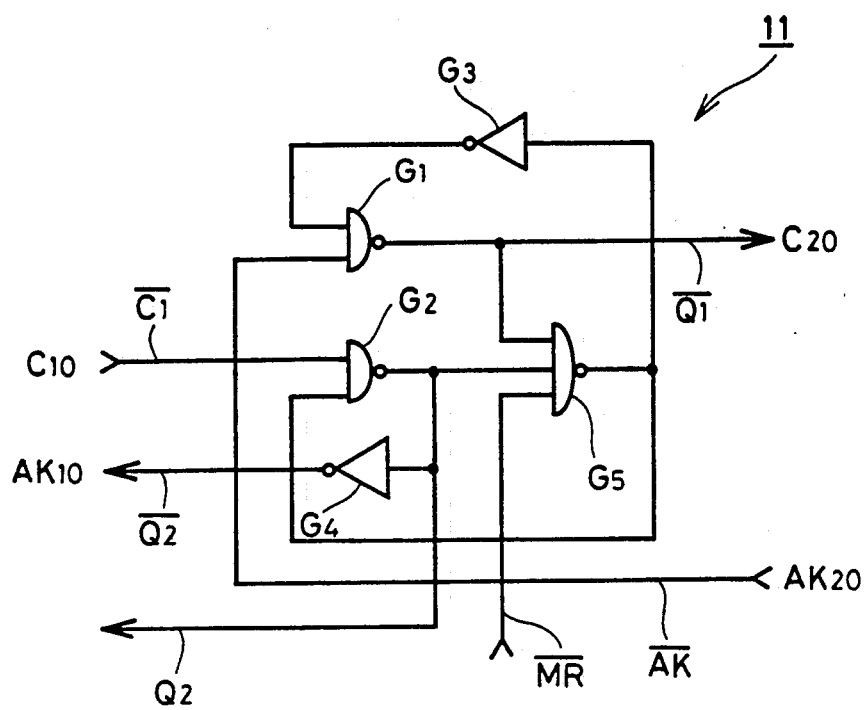
FIG. 3 is a circuit diagram showing a structure of a transfer control portion shown in FIGS. 2 and 8.
Figure 4:
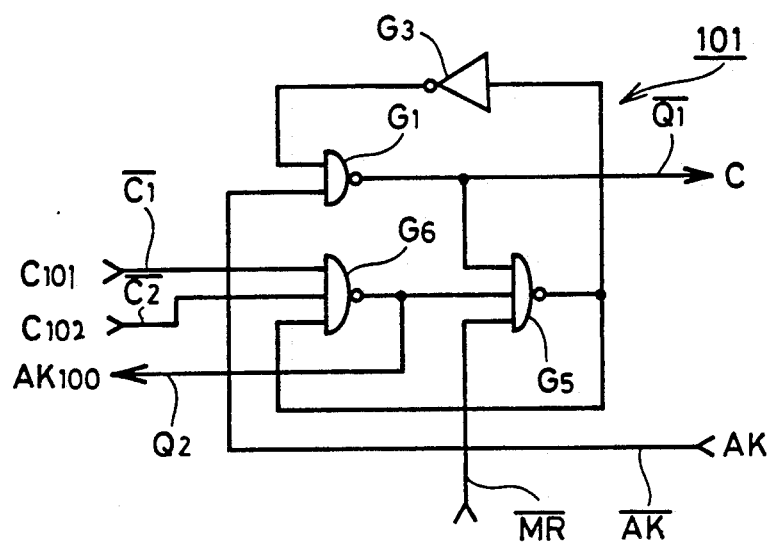
FIG. 4 is a circuit diagram showing a structure of another transfer control portion shown in FIGS. 2 and 8.

FIG. 3 is a diagram showing a detailed circuit structure of the transfer control portion 11. In addition, FIG. 4 is a diagram showing a detailed circuit structure of the transfer control portion 101.

As shown in FIG. 3, the transfer control portion 11 comprises NAND gates G1 and G2, inverters G3 and G4, and a NAND gate G5.

A transmission signal C10 is applied to a transmission signal input terminal $\overline{CI}$ from a transfer control portion (not shown) in the preceding stage, and a transmission authorizing signal Ak10 is outputted from a transmission signal output terminal $\overline{Q2}$. A transmission signal C20 is outputted from a transmission signal output terminal $\overline{Q1}$, and a transmission authorizing signal AK20 is applied to a transmission authorizing signal input terminal $\overline{AK}$ from a transfer control portion 21 in the succeeding stage.

Figure 5:
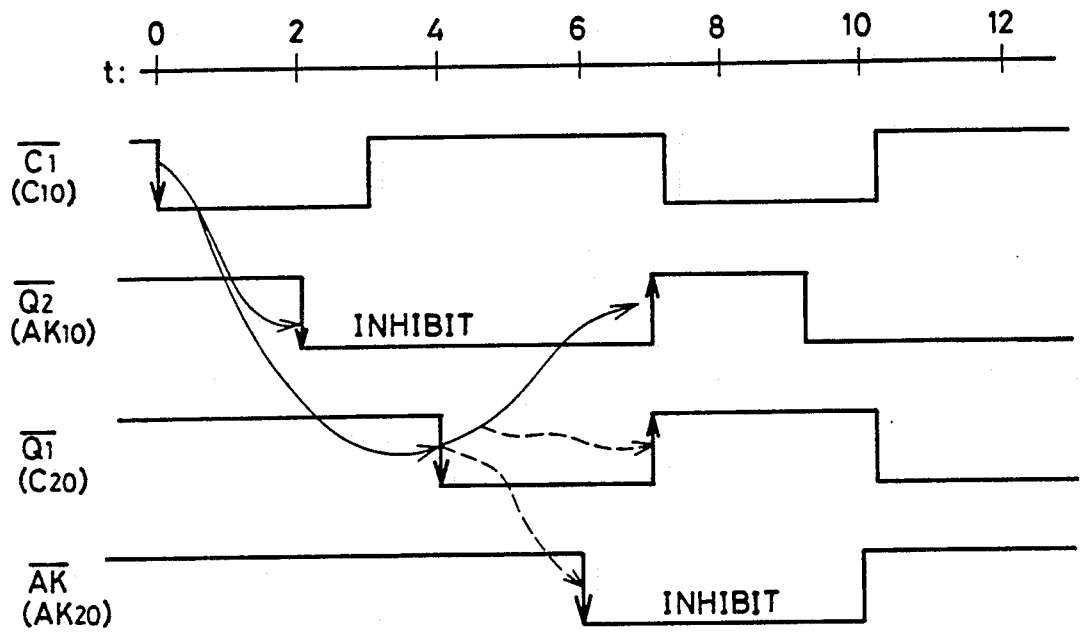
FIG. 5 is a timing chart for explaining an operation of a transfer control portion to occur when a data transmission path in the succeeding stage is in an empty state.
Figure 6:
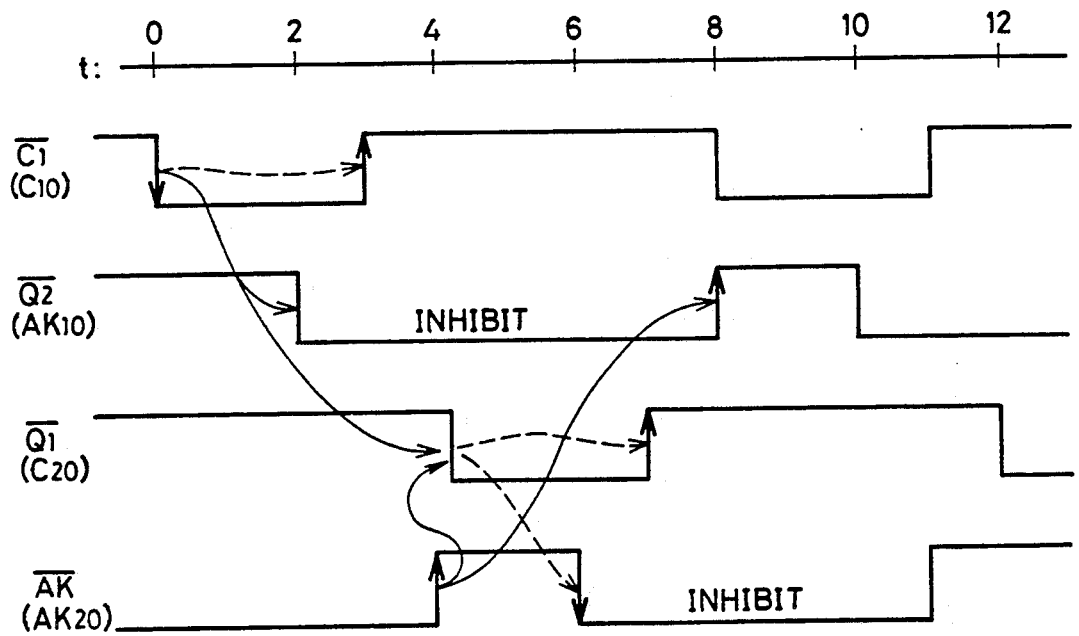
FIG. 6 is a timing chart for explaining an operation of a transfer control portion to occur when the data transmission path in the succeeding stage is in a busy state.

Referring now to timing charges of FIG. 5 and 6, description is made on an operation of the transfer control portion 11 shown in FIG. 3.

FIG. 5 is a timing chart for explaining an operation to occur when a data transmission path in the succeeding stage is in an empty state.

When the data transmission path in the succeeding stage is in an empty state, an "H" level transmission authorizing signal AK20 is applied from a transfer control portion in the succeeding stage. Therefore, a potential of the transmission authorizing signal input terminal $\overline{AK}$ has been at the "H" level. When the transmission signal C10 applied from a transfer control portion in the preceding stage falls to the "L" level, a potential of the transmission signal input terminal $\overline{CI}$ is changed to the "L" level. Consequently, an output of the NAND gate G2 becomes the "H" level. Thus, an output of the inverter G4 becomes the "L" level, and the transmission authorizing signal AK10 output terminal $\overline{Q2}$ falls to the "L" level. On the other hand, an output of the NAND gate G5 becomes the "L" level and an output of the inverter G3 becomes the "H" level. On this occasion, since a potential of the transmission authorizing signal input terminal $\overline{AK}$ is at the "H" level, an output of the NAND gate G1 falls to the "L" level. Consequently, the transmission signal C20 outputted from the transmission signal output terminal $\overline{Q1}$ falls to the "L" level.

The transfer control portion 21 (see FIG. 2) in the succeeding stage receiving the transmission signal C20 is responsive to the fall of the transmission signal C20 for lowering to the "L" level the transmission authorizing signal AK20 to be applied to the transfer control portion 11. Thus, a potential of the transmission authorizing signal input terminal $\overline{AK}$ of the transfer control portion 11 falls to the "L" level. On the other hand, the output of the NAND gate G5 becomes the "H" level and the output of the inverter G3 becomes the "L" level in response to the fall of the output of the NAND gate G1 to the "L" level. Therefore, the output of the NAND gate G1 rises to the "H" level again. Consequently, the transmission signal Q20 rises to the "H" level again. Thus, the transmission signal Q20 falls to the "L" level and then, rises to the "H" level after a lapse of a constant time period.

On the other hand, the transmission signal C10 applied from the transfer control portion in the preceding stage rises to the "H" level after a lapse of a constant time period. Therefore, the output of the NAND gate G2 falls to the "L" level and the output of the inverter G4 rises to the "H" level. Consequently, the transmission authorizing signal AK10 rises to the "H" level again.

As described in the foregoing, if and when the transmission authorizing signal AK20 applied from the transfer control portion in the succeeding stage is in the authorized state (at the "H" level), the transmission authorizing signal AK10 applied to the transfer control portion in the preceding sage enters the inhibited state (becomes the "L" level) in response to the fall of the transmission signal C10 applied from the transfer control portion in the preceding sage, so that the transmission signal C20 applied to the transfer control portion in the succeeding stage falls to the "L" level after a further lapse of a constant time period. Data applied to an input terminal Di of the data holding circuit 12 (see FIG. 2) is latched, to be outputted from an output terminal Qi thereof, in response to the fall of the transmission signal C20. More specifically, data is transmitted from the data transmission path 10 to the data transmission path 20.

FIG. 6 is a timing chart for explaining an operation to occur when a data transmission path in the succeeding stage is in a busy state.

In this case, the transmission authorizing signal AK20 applied from a transfer control portion in the succeeding stage has been at the "L" level. When the transmission signal C10 applied from a transfer control portion in the preceding stage falls to the "L" level, an output of the NAND gate G2 becomes the "H" level and an output of the inverter G4 falls to the "L" level. Consequently, the transmission authorizing signal AK10 outputted from the transmission authorizing signal output terminal $\overline{Q2}$ falls to the "L" level. When the transmission authorizing signal AK20 applied from the transfer control portion in the succeeding stage is at the "L" level (in the inhibited state), an output of the NAND gate G1 has been at the "H" level. Thus, so long as the transmission authorizing signal AK20 is at the "L" level, the transmission signal C20 applied to the transfer control portion in the succeeding stage is held at the "H" level. Thus, data transmission is not made from the data transmission path 10 to the data transmission path 20 (see FIG. 2).

When the transmission authorizing signal AK20 applied from the transfer control portion in the succeeding stage falls to the "H" level, the output of the NAND gate G1 falls to the "L" level. Consequently, the transmission signal C20 applied to the transfer control portion in the succeeding stage falls to the "L" level. Data applied to an input terminal Di of the data holding circuit 12 is latched, to be outputted from an output terminal Qi thereof, in response to the fall of the transmission signal C20 (see FIG. 2).

On the other hand, the transfer control portion in the succeeding stage is responsive to the fall of the transmission signal C20 applied from the transfer control portion 11 for lowering to the "L" level the transmission authorizing signal AK20 to be applied to the transfer control portion 11 after a lapse of a constant time period. Meanwhile, the transmission authorizing signal AK10 applied to the transfer control portion in the preceding stage rises to the "H" level after a lapse of a constant time period, in response to the rise of the transmission authorizing signal AK20 applied from the transfer control portion in the succeeding stage.

As described in the forgoing, when the transmission authorizing signal AK20 applied from the transfer control portion in the succeeding stage is in the inhibited state (at the "L" level), the transmission signal C20 applied to the transfer control portion in the succeeding stage is not lowered to the "L" level. More specifically, when the data transmission path 20 in the succeeding stage is in a busy state, data transmission is not made from the data transmission path 10 to the data transmission path 20. An output from the transmission authorizing signal output terminal Q2 is complementary to an output from the transmission authorizing signal output terminal $\overline{Q2}$.

Meanwhile, structures of the transfer control portions 21, 31, 41, 51 and 61 are the same as that shown in FIG. 3.

FIG. 4 is a circuit diagram showing a structure of the transfer control portion 101 shown in FIG. 2.

The transfer control portion 101 shown in FIG. 4 is provided with a NAND gate G6 in place of the NAND gate G2 included in the transfer control portion 11 shown in FIG. 3. Transmission signals C101 and C102 are respectively applied to the NAND gate G6 from the transfer control portions 31 and 61 (see FIG. 2) in the preceding stage through transmission signal input terminals $\overline{C1}$ and $\overline{C2}$. A transmission authorizing signal AK100 is outputted from a transmission authorizing signal output terminal Q2. In addition, a transmission signal C is outputted from a transmission signal output terminal $\overline{Q1}$. A transmission authorizing signal AK is applied to a transmission authorizing signal input terminal $\overline{AK}$ from a transfer control portion (not shown) in the succeeding stage. The structure of the other portions is the same as that of the transfer control portion 11 shown in FIG. 3.

With respect to the operation of the transfer control portion 101 shown in FIG. 4, the waveform of the transmission signal C10 in FIGS. 5 and 6 corresponds to the waveform of the transmission signal C101 or C102. Thus, when either one of the transmission signals C101 and C102 falls to the "L" level, the operation shown in FIGS. 5 and 6 is performed.

Description is now made on an operation of the data transmission apparatus shown in FIG. 2.

In the initial state, an "L" level reset signal $\overline{RST}$ is applied to the transfer control portions 11, 21, 31, 41, 51, 61 and 101, the AND gates 85 and 86, and the NAND gates 82, 83 and 91. Therefore, the transfer control portions 11, 21, 31, 41, 51, and 61 are respectively reset, so that potentials of respective output terminals thereof $\overline{Q1}$ and $\overline{Q2}$ become the "H" level. In addition, the transfer control portion 101 is reset, so that potentials of output terminals thereof $\overline{Q1}$ and $\overline{Q2}$ respectively become the "H" and "L" levels. An output of the NAND gate 82 becomes the "H" level in response to the reset signal $\overline{RST}$, to be inputted to the NAND gate 81. In addition, an output of the NAND gate 91 becomes the "H" level in response to the reset signal $\overline{RST}$.

Since the transfer control portions 31 and 61 are reset, all inputs to the NAND gate 92 become the "L" level and an output thereof becomes the "H" level. Consequently, all inputs of the NAND gate 81 become the "H" level and an output thereof becomes the "L" level. In this state, a flip-flop in the preceding stage comprising the NAND gates 81 and 82 is stabilized.

A flip-flop in the succeeding stage comprising the NAND gates 83 and 84 receives an output of the flip-flop in the preceding stage. Since the "L" level reset signal $\overline{RST}$ is inputted to the NAND gate 83, an output thereof becomes the "H" level. Consequently, an output of the NAND gate 84 becomes the "L" level. In this state, the flip-flop in the succeeding stage is stabilized.

The "H" level output of the NAND gate 83 is provided to the NOR gate 89. Consequently, a transmission authorizing signal AK81 outputted from the NOR gate 89 becomes the "L" level. As a result, data transmission from the data transmission path 30 to the data transmission path 100 is inhibited. On the other hand, the "L" level output of the NAND gate 84 is provided to the NOR gate 90. Consequently, a transmission authorizing signal AK82 outputted from the NOR gate 90 becomes the "H" level. As a result, data transmission from the data transmission path 60 to the data transmission path 100 is authorized.

Thus, when the "L" level reset signal $\overline{RST}$ is applied, data transmission from the data transmission path 30 to the data transmission path 100 is inhibited while data transmission from the data transmission path 60 to the data transmission path 100 is authorized. Thereafter, the reset signal $\overline{RST}$ is returned to the "H" level.

In this state, it is assumed that a transmission signal C10 which is an "L" level pulse signal is applied to the transfer control portion 11 and data 1 is applied to the data holding circuit 12.

On this occasion, since a transmission authorizing signal AK 20 from the transfer control portion 21 is at the "H" level (in the authorized state), a transmission signal C20 from the transfer control portion 11 falls to the "L" level. This transmission signal C20 is applied to the transfer control portion 21, and becomes a clock pulse of the data holding circuit 12. Consequently, the data 1 is outputted to the output terminal Qi of the data holding circuit 12. Since a transmission authorizing signal AK30 from the transfer control portion 31 is at the "H" level (in the authorized state), a transmission signal C30 outputted from the transfer control portion 21 falls to the "L" level. This transmission signal C30 is applied to the transfer control portion 31, and becomes a clock pulse of the data holding circuit 22. Consequently, the data 1 applied from the data holding circuit 12 is outputted from the output terminal Qi of the data holding circuit 22.

As a result, a transmission authorizing signal AK31 outputted from the transfer control portion 31 becomes the "H" level (in the inhibited state), to be inputted to the NAND gates 91 and 92. So long as data 2 is applied to the data holding circuit 60 through the data holding circuits 40 and 50 and an "L" level transmission signal C60 is not applied to the transfer control portion 61, a transmission authorizing signal AK61 from the transfer control portion 61 is held at the "L" level (in the authorized state). Therefore, the output of the NAND gate 92 is held at the "H" level. On the other hand, since the transmission authorizing signal AK31 from the transfer control portion 31 has been at the "H" level (in the inhibited state) and a transmission authorizing signal AK60 from the transfer control portion 61 has been at the "H" level (in the authorized state), the output of the NAND gate 91 becomes the "L" level.

The outputs are provided to the NAND gate 81. Consequently, the output of the NAND gate 81 is changed from the "L" level to the "H" level. The output of the NAND gate 81 is provided to the NAND gates 82 and 83. Since all inputs of the NAND gate 82 become the "H" level, so that the output thereof becomes the "L" level. In this state, the flip-flop in the preceding stage is stabilized.

Therefore, the output of the NAND gate 84 is changed from the "L" level to the "H" level. The output of the NAND gate 84 is provided to the NAND gate 83. Consequently, the output of the NAND gate 83 is changed from the "H" level to the "L" level. In this state, the flip-flop in the succeeding stage is stabilized.

The "L" level output from the NAND gate 83 is provided to the NOR gate 89. Since a transmission authorizing signal AK100 from the transfer control portion 101 is at the "L" level (in the authorized state), the transmission authorizing signal AK81 from the NOR gate 89 becomes the "H" level (enters the authorized state). Consequently, a transmission signal C101 from the transfer control portion 31 falls to the "L" level. This transmission signal C101 is applied to the transfer control portion 101, and becomes a clock pulse of the data holding circuit 32. As a result, the data 1 applied to the input terminal Di of the data holding circuit 32 is outputted from the output terminal Qi thereof.

When a transmission authorizing signal AK applied from a transfer control portion (not shown) in a stage succeeding the transfer control portion 101 is at the "H" level (in the authorized state), a transmission signal C outputted from the transfer control portion 101 falls to the "L" level. This transmission signal C becomes a clock pulse of the data holding circuit 102, so that the data 1 applied to an input terminal Di of the data holding circuit 102 is outputted from an output terminal Qi thereof.

In a period during which the "L" level transmission signal C101 is outputted to the transfer control portion 101 from the transfer control portion 31, an "H" level output from the NAND gate 84 is held in the flip-flop in the succeeding stage, so that the transmission authorizing signal AK82 from the NOR gate is held at the "L" level (in the inhibited state). As a result, an "L" level transmission signal C102 is not outputted to the transfer control portion 101 from the transfer control portion 61. In addition, since the "L" level transmission signal C101 from the transfer control portion 31 is applied to a reset terminal $\overline{R}$ of the D-type flip-flop 88, a potential of an output terminal Q thereof becomes the "L" level. Consequently, an "L" level signal is applied to an output enable terminal OE of the data holding circuit 62, so that an output terminal Qi thereof enters a high impedance state. Therefore, an output from the output terminal Qi of the data holding circuit 32 dose not collide with an output from the output terminal Qi of the data holding circuit 62.

Thus, when the "L" level transmission signal C10 is applied to the transfer control portion 11 and the data 1 is applied to the data holding circuit 12, the data 1 is transmitted to the data holding circuit 102 through the data holding circuits 22 and 32.

On the other hand, when the "L" level transmission signal C40 is applied to the transfer control portion 41 and the data 2 is applied to the data holding circuit 42, the data 2 is transmitted to the data holding circuit 10 through the data holding circuits 52 and 62 in the above described manner.

Then, after the initial state, it is assumed that the data 2 is inputted with constant time deviation after the data 1 is inputted.

The "L" level transmission signal C40 and the data 2 are respectively applied to the transfer control portion 41 and the data holding circuit 42 a little later after the "L" level transmission signal C10 is applied to the transfer control portion 11 and the data 1 is applied to the data holding circuit 12. In this case, the "L" level transmission signal C20 is applied t the transfer control portion 21 in response to the transmission signal C10 and then, the "L" level transmission signal C30 is applied to the transfer control portion 31. Consequently, the transmission authorizing signal AK31 from the transfer control portion 31 is changed from the "L" level to the "H" level (the inhibited state).

As a result, the output of the NAND gate is changed from the "H" level to the "L" level. In addition, the output of the NAND gate 81 is changed from the "L" level to the "H" level, and the output of the NAND gate 82 is changed from the "H" level to the "L" level. In this state, the flip-flop in the preceding stage comprising a the NAND gates 81 and 82 is stabilized.

Furthermore, the output of the NAND gate 82 is provided to the NAND gate 84. Consequently, the output of the NAND gate 84 is changed from the "L" level to the "H" level, and the output of the NAND gate 83 is changed from the "H" level to the "L" level. In this state, the flip-flop in the succeeding stage comprising the NAND gates 83 and 84 is stabilized.

Additionally, when the "L" level transmission signal C40 is applied to the transfer control portion 41 and the data 2 is applied to the data holding circuit 42, the "L" level transmission signal C60 is applied to the transfer control portion 61 and the data 2 is applied to the data holding circuit 62 in the same manner. Consequently, the output of the NAND gate 82 is set to the "H" level.

Additionally, the transmission authorizing signal AK60 from the transfer control portion 61 becomes the "L" level (enters the inhibited state). Consequently, the output of the NAND gate 91 becomes the "H" level, so that the output of the NAND gate 81 is ready to be reset to the "L" level. However, since both the transmission authorizing signal AK31 from the transfer control portion 31 and the transmission authorizing signal AK61 from the transfer control portion 61 are at the "H" level (in the inhibited state), the output of the NAND gate 92 becomes the "L" level. Therefore, an "L" level signal is inputted to the NAND gates 81 and 82 of the flip-flop in the preceding stage, so that respective outputs thereof become both the "H" level. More specifically, both inputs of the NAND gates 83 and 84 of the flip-flop in the succeeding stage become the "H" level.

Thus, the flip-flop in the succeeding stage is held in the output state at the present time point. More specifically, the "L" level output from the NAND gate 83 is applied to the NOR gate 89, so that the "H" level transmission authorizing signal AK81 (in the authorized state) is outputted from the NOR gate 89. Consequently, data transmission from the data holding circuit 32 to the data holding circuit 102 is authorized. On this occasion, an "H" level output from the NAND gate 84 is applied to the NOR gate 90. Consequently, the "L" level transmission authorizing signal AK82 (in the inhibited state) is applied from the NOR gate 90. Therefore, data transmission from the data holding circuit 62 to the data holding circuit 102 is inhibited. After the "L" level transmission signal C101 is applied to the transfer control portion 101 from the transfer control portion 31 so that the data 1 is transmitted from the data holding circuit 32 to the data holding circuit 102, data transmission from the data holding circuit 62 to the data holding circuit 102 is authorized. As a result, the "L" level transmission signal C102 is applied to the transfer control portion 101 from the transfer control portion 61, and the data 2 is applied to the data holding circuit 102 from the data holding circuit 62.

The operation to occur when the data 1 is inputted a little later than the data 2 will be described in the above described manner.

As described in the forgoing, when the data 1 and the data 2 are respectively applied to the data transmission paths 30 and 60, data inputted later is temporarily stopped by the flip-flop in the preceding stage comprising the NAND gates 81 and 82 and the flip-flop in the succeeding stage comprising the NAND gates 83 and 84.

Then, it is assumed that data are continuously inputted to both transmission paths so that the data stay in the transmission paths.

In the embodiment shown in FIG. 2, data transmission from the data transmission path 60 to the data transmission path 100 is given priority over data transmission from the data transmission path 30 to the data transmission path 100.

First, in a state immediately before data stay, while the "L" level transmission signal C101 is applied to the transfer control portion 101 from the transfer control portion 61 and the data 2 is transmitted to the data holding circuit 102 from the data holding circuit 62, the output of the NAND gate 82 and the output of the NAND gate 91 become the "H" level. Therefore, the NAND gate 81 is not set. More specifically, the output of the NAND gate 81 becomes the "L" level, the output of the NAND gate 83 become the "H" level, and the output of the NAND gate 84 becomes the "L" level, so that the flip-flop in the succeeding stage is stabilized.

In this state, when the stay of data is made, data exist in the data transmission paths 30 and 60. Therefore, both the transmission authorizing signal AK31 from the transfer control portion 31 and the transmission authorizing signal AK61 from the transfer control portion 61 become the "H" level (enter the inhibited state). Consequently, the output of the NAND gate 92 becomes the "L" level, and the output of the NAND gate 91 becomes the "H" level. Therefore, the output of the NAND gate 81 is set to the "H" level. Since the output of the NAND gate 82 has been already at the "H" level, both inputs of the NAND gates 83 and 84 of the flip-flop in the succeeding stage become the "H" level. Therefore, the flip-flop in the succeeding stage is held in the previous state.

Furthermore, when data stay immediately after the "L" level transmission signal C102 is applied to the transfer control portion 101 from the transfer control portion 61 and the data 2 is transmitted to the data holding circuit 102 from the data holding circuit 62, the output of the NAND gate 91 is reset to the "L" level.

At the same time, the transmission signal C60 from the transfer control portion 51 becomes the "L" level, to be inputted to the NAND gate 82. As a result, both the outputs of the NAND gates 81 and 82 of the flip-flop in the preceding stage become the "H" level, and the outputs of the NAND gates 83 and 84 of the flip-flop in the succeeding stage are held in the previous state.

Thus, the transmission control portion 61 remains authorized to transmit data, and the transmission control portion 31 remains inhibited from transmitting data. Therefore, this state is preserved until the stay of data in the data transmission path 60 given priority is decreased.

Then, when data stay while the "L" level transmission signal C101 is applied to the transfer control portion 101 from the transfer control portion 31 and the data 1 is transmitted to the data holding circuit 102 from the data holding circuit 32, the transmission signal C60 applied to the transfer control portion 61 at the time of data transmission becomes the "L" level, so that the output of the NAND gate 82 becomes the "H" level. In addition, an "L" level signal is outputted to the NAND gates 82 and 81 from the NAND gate 92 such that data transmission by the transfer control portion 31 from the data holding circuit 32 to the data holding circuit 102 is not interrupted.

Additionally, the output of the NAND gate 91 is set to the "H" level in order to decrease the stay of data in the data transmission path 60. However, both the outputs of the NAND gates 82 and 81 of the flip-flop in the preceding stage have been already set to the "H" level by the "L" level output from the NAND gate 92. Therefore, the outputs of the NAND gates 83 and 84 of the flip-flop in the succeeding stage are held. Thus, after data transmission from the data holding circuit 32 to the data holding circuit 102 is completed which is authorized at the present time point, the output of the NAND gate 92 becomes the "H" level. Consequently, the output of the NAND gate 81 is reset to the "L" level, so that the output of the NAND gate 83 becomes the "H" level and the output of the NAND gate 84 becomes the "L" level. As a result, data transmission made by the transfer control portion 31 is inhibited, while data transmission made by the transfer control portion 61 is authorized.

Thus, the arbitration control portion 80 keeps authorizing the transfer control portion 61 given priority to transmit data while inhibiting the transfer control portion 31 from transmitting data.

Additionally, if and when data stay immediately after data transmission made by the transfer control portion 31 is completed, data transmission made by the transfer control portion 31 is inhibited while data transmission made by the transfer control portion 61 is authorized, as described above. More specifically, this state is preserved until the stay of data in the data transmission path 60 given priority is decreased.

Thus, if and when the stay of data is made, the arbitration control portion 80 functions such that the stay of data in a data transmission path given priority, i.e., the data transmission path 60 comprising the transfer control portion 61 and the data holding circuit 62 is decreased.

As described in the foregoing, according to the present embodiment, when only the data 1 exist and the data 2 do not exist in a state in which the output-side data transmission path 100 is empty, the data 1 are sequentially outputted. In addition, when only the data 2 exist and the data 1 do not exist, the data 2 are sequentially outputted.

On the other hand, when the data 1 and 2 are transmitted with the maximum transfer capability of each of the input-side transmission paths, the data transmission path 100 does not simultaneously process the data. Therefore, data stay in the data transmission paths 30, 20 and 10 and 60, 50 and 40. In this case, the arbitration control portion 80 functions such that the data in the data transmission path 60 is transmitted to the data transmission path 100 by priority so as to decrease the stay of data in the transmission path given priority.

Additionally, if and when data do not stay in the data transmission paths 60, 50 and 40 given priority, the data are transmitted to the data transmission path 100 in the order in which data arrives at the data transmission paths 30 and 60.

Figure 7:
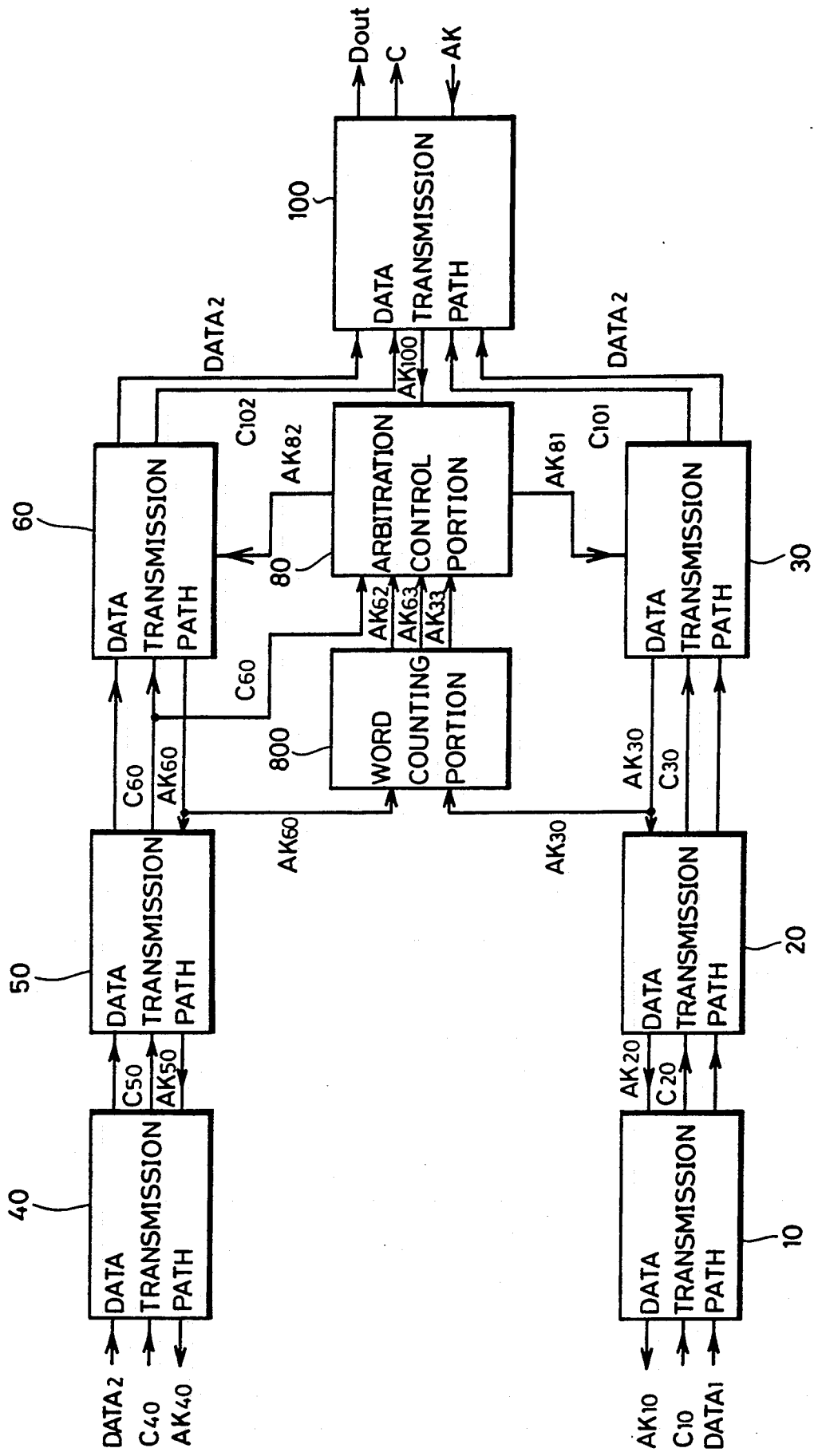
FIG. 7 is a block diagram showing a structure of a data transmission apparatus according to another embodiment of the present invention.

FIG. 7 is a block diagram showing a structure of a data transmission apparatus according to another embodiment of the present invention.

According to this data transmission apparatus, packet data comprising an arbitrary number of words is transmitted. In this embodiment, it is assumed that the packet data comprises two words.

In the embodiment shown in FIG. 7, there is further provided a word counting portion 800. A transmission authorizing signal AK30 outputted from a data transmission path 30 and a transmission authorizing signal AK60 outputted from a data transmission path 60 are applied to the word counting portion 800. The word counting portion 800 outputs transmission authorizing signals AK33, AK62 and AK63 obtained by respectively frequency-dividing into two the transmission authorizing signals AK30 and AK60. The transmission authorizing signals AK62 and AK63 are complementary signals. A transmission signal C60 outputted from the data transmission path 50 and the transmission authorizing signals AK33, AK62 and AK63 outputted from the word counting portion 800 are applied to the arbitration control portion 80. The structure of the other portions is the same as that in the embodiment shown in FIG. 1.

The arbitration control portion 80 is responsive to a transmission authorizing signal AK100 from a data transmission path 100 which is an output-side transmission path for arbitrating the order of output of packet data from input-side transmission paths such that respective packet data in parallel input-side transmission paths are transmitted to the data transmission path 100 in units of packet data comprising a plurality of words based on states and priorities of the packet data.

In this embodiment, the data transmission path 60 is given higher priority over the data transmission path 30. In the initial state, the data transmission path 100 is in a state in which data can be received. Therefore, the transmission authorizing signal AK100 indicating that data can be received is applied to the arbitration control portion 80 from the data transmission path 100. The arbitration control portion 80 is responsive to the transmission authorizing signal AK100 for bringing a transmission authorizing signal AK81 applied to the data transmission path 30 to the inhibited state while bringing a transmission authorizing signal AK82 applied to the data transmission path 60 to the authorized state.

First, a transmission signal C10 is applied to a data transmission path 10, so that a first word of packet data 1 arrives at the data transmission path 10. The first word is transmitted to a data transmission path 30 through a data transmission path 20. On this occasion, a transmission authorizing signal AK30 outputted from the data transmission path 30 is applied to the word counting portion 800. Similarly, a second word of the packet data 1 is transmitted to the data transmission path 20. The word counting portion 800 counts the number of words passing through the data transmission path 20, generates pulses in units of packet data, and transmits the same to the arbitration control portion 80.

When there is no data in the data transmission path 60, the arbitration control portion 80 authorizes the data transmission path 30 to transmit packet data to the data transmission path 100 using the transmission authorizing signal AK81 and inhibits the data transmission path 60 from transmitting packet data to the data transmission path 100. Since the data transmission path 30 sequentially transmits the first word and the second word of the packet data 1 to the data transmission path 100 since it is authorized to transmit data to the data transmission path 100. When the second word of the packet data 1 passes through the data transmission path 100, the transmission authorizing signal AK100 for authorizing transmission of packet data is applied from the data transmission path 100 to the arbitration control portion 80. Consequently, the arbitration control portion 80 applies the transmission authorizing signal AK81 for authorizing transmission of packet data to the data transmission path 30. On this occasion, the data transmission path 60 remains inhibited from transmitting packet data, which is waiting until transmission of packet data is authorized.

Then, a first word of packet data 2 arrives at a data transmission path 40. The first word is transmitted to the data transmission path 60 through a data transmission path 50 in the same manner. On this occasion, the transmission authorizing signal AK60 outputted from the data transmission path 60 is applied to the word counting portion 80. Then, a second word of the packet data 2 is transmitted to the data transmission path 60 through the data transmission path 40 in the same manner. The word counting portion 80 counts the number of words passing through the data transmission path 50, generates pulses in units of packet data, and applies the same to the arbitration control portion 80. When it is confirmed using the transmission authorizing signal AK30 from the data transmission path 30 that no data exists in the data transmission path 30, the arbitration control portion 80 authorizes the data transmission path 60 to transmit packet data to the data transmission path 100 using a transmission authorizing signal AK82 and inhibits the data transmission path 30 from transmitting packet data to the data transmission path 100.

Since the data transmission path 60 is authorized to transmit packet data to the data transmission path 100, the first word and the second word of the packet data 2 are sequentially transmitted to the data transmission path 100. When the second word of the packet data 2 passes through the data transmission path 100, the transmission authorizing signal AK100 for authorizing transmission of packet data is applied from the data transmission path 100 to the arbitration control portion 80. Consequently, the arbitration control portion 80 applies again to the data transmission path 60 the transmission authorizing signal AK82 for authorizing transmission of packet data.

Then, it is assumed that the packet data 2 is inputted a little later than the packet data 1.

When the first word of the packet data 1 arrives at the data transmission path 10, the first word is transmitted to the data transmission path 30 through the data transmission path 20. On this occasion, the transmission authorizing signal AK30 outputted from the data transmission path 30 is applied to the word counting portion 800. Similarly, the second word of the packet data 1 is transmitted to the data transmission path 20 through the data transmission path 10.

The word counting portion 800 counts the number of words passing through the data transmission path 20, generates pulses in units of packet data, and applies the same to the arbitration control portion 80. Therefore, the arbitration control portion 80 inhibits the data transmission path 60 from transmitting packet data to the data transmission path 100. In this state, when the first word of the packet data 2 arrives at the data transmission path 40, the first word is transmitted to the data transmission path 60 through the data transmission path 50, where the first word is temporarily stopped. After the second word of the packet data 1 passes through the data transmission path 30, transmission of packet data from the data transmission path 60 to the data transmission path 100 is authorized.

Thus, the arbitration control portion 80 arbitrates input-side transmission paths such that packet data late in arriving out of the packet data 1 and 2 is temporarily stopped in the data transmission path 30 or 60.

Then, it is assumed that a plurality of packet data stay in both input-side transmission paths.

In the embodiment shown in FIG. 7, transmission of packet data from the data transmission path 60 to the data transmission path 100 is given priority over transmission of packet data from the data transmission path 30 to the data transmission 100. Therefore, the arbitration control portion 80 authorizes the data transmission path 60 to transmit packet data to the data transmission path 100 and inhibits the data transmission path 30 from transmitting packet data to the data transmission path 100 until the stay of the packet data in the data transmission path 60 is decreased.

The staying state of packet data is determined by the transmission authorizing signals AK33, AK62 AK63 inputted to the arbitration control portion 80 from the word counting portion 800. In addition, the priority of data transmission paths is determined by the transmission signal C60.

Figure 8:
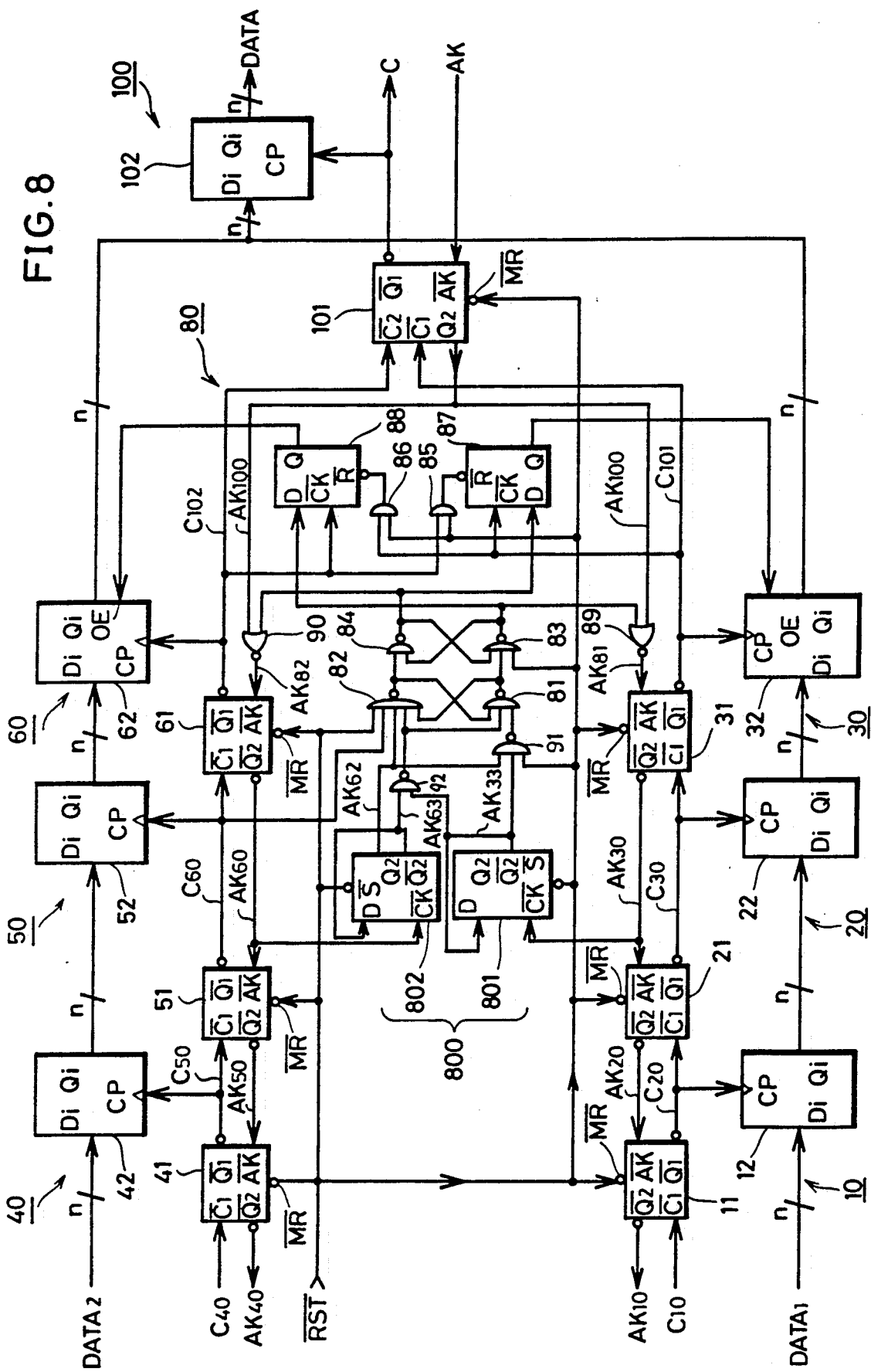
FIG. 8 is a specific circuit diagram of the data transmission apparatus shown in FIG. 7.

FIG. 8 is a specific circuit diagram of the data transmission apparatus shown in FIG. 7.

In FIG. 8, a word counting portions 800 comprises D-type flip-flops 801 and 802. A transmission authorizing signal AK30 from a transfer control portion 31 is applied to a clock terminal $\overline{CK}$ of the D-type flip-flop 801. A transmission authorizing signal AK60 from a transfer control portion 61 is applied to a clock terminal $\overline{CK}$ of the D-type flip-flop 802. A transmission authorizing signal AK33 is outputted from an output terminal $\overline{Q2}$ of the D-type flip-flop 801 and a transmission authorizing signal AK63 is outputted from an output terminal $\overline{Q2}$ of the D-type flip-flop 802. In addition, a transmission authorizing signal AK62 which is an inverted signal of the transmission authorizing signal AK63 is outputted from an output terminal Q2 of the D-type flip-flop 802. Each of the D-type flip-flops 801 and 802 serves as a frequency divider. The transmission authorizing signals AK33 and AK63 are applied to a NAND gate 92, and the transmission authorizing signal AK62 is applied to NAND gates 82 and 91. The structure of the other portions is the same as that shown in FIG. 2.

Description is now made on an operation of the data transmission apparatus shown in FIG. 8. In the following description, the same portions as those described in the embodiment shown in FIG. 2 are suitably omitted.

In the initial state, when a reset signal $\overline{RST}$ becomes the "L" level, transfer control portions 11, 21, 31, 41, 51, 61 and 101 are reset. In addition, the D-type flip-flops 801 and 802 are set, so that outputs from the output terminals Q2 thereof and outputs from the output terminals $\overline{Q2}$ thereof respectively become the "H" and "L" levels. Therefore, in the same manner as that in the embodiment shown in FIG. 2, an output of the NAND gate 82 becomes the "H" level, and an output of the NAND gate 81 becomes the "L" level. In this state, a flip-flop in the preceding stage is stabilized. In addition, an output of a NAND gate 83 becomes the "H" level and an output of a NAND gate 84 becomes the "L" level. In this state, a flip-flop in the succeeding stage is stabilized.

In the above described manner, a transmission authorizing signal AK81 outputted from a NOR gate 89 becomes the "L" level. As a result, transmission of packet data from a data transmission path 30 to a data transmission path 100 is inhibited. On the other hand, a transmission authorizing signal AK82 outputted from a NOR gate 90 becomes the "H" level. As a result, transmission of packet data from a data transmission path 60 to the data transmission path 100 is authorized.

In this state, it is assumed that a transmission signal C10 which is an "L" level pulse signal is applied to the transfer control portion 11, so that a first word of packet data 1 is applied to a data holding circuit 12.

This first word is outputted from an output terminal Qi of the data holding circuit 12 in response to the fall of a transmission signal C20. Since the transmission authorizing signal AK30 from the transfer control portion 31 is at the "H" level (in the authorized state), a transmission signal C30 outputted from the transfer control portion 21 falls to the "L" level. The first word is outputted from an output terminal Qi of a data holding circuit 22 in response to the fall of the transmission signal C30. In addition, the transmission authorizing signal AK30 from the transfer control portion 31 becomes a clock pulse for the D-type flip-flop 801. The D-type flip-flop 801 frequency-divides into two the transmission authorizing signal AK30, to apply the transmission authorizing signal AK33 thus obtained to the NAND gate 91.

In the above described manner, a signal obtained by arbitrarily frequency-dividing the transmission authorizing signal AK30 from the transfer control portion 31 is inputted to the NAND gate 91, so that data (packet data) in units of packets comprising an arbitrary number of words can be arbitrated.

When the transmission authorizing signal AK33 from the D-type flip-flop 801 becomes the "H" level, an output of the NAND gate 91 is changed from the "H" level to the "L" level. Consequently, the output of the NAND gate 81 is set to the "H" level. In addition, the output of the NAND gate 82 becomes the "L" level. In this state, the flip-flop in the preceding stage is stabilized. Furthermore, the output of the NAND gate 84 becomes the "H" level, and the output of the NAND gate 83 becomes the "L" level. In this state, the flip-flop in the succeeding stage is stabilized. Therefore, the transmission authorizing signal AK81 from the NOR gate 89 becomes the "H" level (in the authorized state). As a result, the first word of the packet data 1 applied to an input terminal Di a data holding circuit 32 is outputted from an output terminal Qi therof.

When a transmission authorizing signal AK applied from a transfer control portion (not shown) in a stage succeeding a transfer control portion 101 is at the "H" level (in the authorized state), a first word of packet data applied to an input terminal Di of a data holding circuit 102 is outputted from an output terminal Qi thereof.

A second word of the packet data 1 is outputted from the output terminal Qi of the data holding circuit 102 through the data holding circuits 12, 22 and 32, subsequently to the first word.

Meanwhile, in a period during which an "L" level transmission signal C101 is outputted from the transfer control portion 31 to the transfer control portion 101, an "L" level signal is applied to an output enable terminal OE of a data holding circuit 62, so that an output terminal Qi thereof enters an high impedance state. Therefore, an output from the output terminal Qi of the data holding circuit 32 does not collide with an output from the output terminal Qi of the data holding circuit 62.

Thus, the packet data 1 comprising two words is transmitted to the data holding circuit 102 through the data holding circuits 12, 22 and 32.

On the other hand, when an "L" level transmission signal C40 is applied to the transfer control portion 41 and packet data 2 is applied to a data holding circuit 42, the packet data 2 is transmitted to the data holding circuit 102 through the data holding circuits 52 and 62 in the above described manner.

Then, it is assumed that after the initial state, the packet data 1 is inputted and then, the packet data 2 is inputted with constant time deviation.

The "L" level transmission signal C40 is applied to the transfer control portion 41 and the first word of the packet data 2 is applied to the data holding circuit 42 a little later after the "L" level transmission signal C10 is applied to the transfer control portion 11 and the first word of the packet data 1 is applied to the data holding circuit 12. In this case, the "L" level transmission signal C20 is applied to the transfer control portion 21 in response to the transmission signal C10 and then, the "L" level transmission signal C30 is applied to the transfer control portion 31. Consequently, the transmission authorizing signal AK30 from the transfer control portion 31 is changed from the "H" level to the "L" level (the inhibited state). This transmission authorizing signal AK30 becomes a clock pulse for the D-type flip-flop 801, so that the transmission authorizing signal AK33 from the D-type flip-flop 801 becomes the "H" level.

As a result, the output of the NAND gate 91 is changed from the "H" level to the "L" level. Consequently, the output of the NAND gate 81 becomes the "H" level and the output of the NAND gate 82 becomes the "L" level. In this state, the flip-flop in the preceding stage is stabilized. In addition, the output of the NAND gate 84 becomes the "H" level and the output of the NAND gate 83 becomes the "L" level. In this state, the flip-flop in the succeeding stage is stabilized.

Furthermore, in the same manner, an "L" level transmission signal C60 is applied to the transfer control portion 61 and the first word of the packet data 2 is applied to the data holding circuit 62. Consequently, the output of the NAND gate 82 is set to the "H" level.

Additionally, the transmission authorizing signal AK60 from the transfer control portion 61 becomes the "L" level (enters the inhibited state). This transmission authorizing signal AK60 becomes a clock pulse for the D-type flip-flop 802, so that the transmission authorizing signal AK62 from the D-type flip-flop 802 falls to the "L" level. Therefore, the output of the NAND gate 91 becomes the "H" level, so that the output of the NAND gate 81 is ready to be reset to the "L" level. However, since both the transmission authorizing signals AK33 and Ak63 have been at the "H" level, an output of the NAND gate 92 becomes the "L" level. Therefore, an "L" level signal is inputted to the NAND gates 81 and 82 of the flip-flop in the preceding stage, so that respective outputs thereof become both the "H" level.

Thus, the flip-flop in the succeeding stage is held in the output state at the present time point. Therefore, transmission of packet data from the data holding circuit 32 to the data holding circuit 102 is authorized, and transmission of packet data from the data holding circuit 62 to the data holding circuit 102 is inhibited.

After the transmission signal C101 having pulses corresponding to two words of the packet data 1 is applied to the transfer control portion 101 from the transfer control portion 31 so that two words of the packet data 1 are transmitted from the data holding circuit 32 to the data holding circuit 102, transmission of packet data from the data holding circuit 62 to the data holding circuit 102 is authorized. As a result, a transmission signal C102 having pulses corresponding to two words is applied to the transfer control portion 101 from the transfer control portion 61, and two words of the packet data 2 are sequentially transmitted to the data holding circuit 102 from the data holding circuit 62.

The operation to occur when the packet data 1 is inputted a little later than the packet data 2 is described in the above described manner.

Thus, when the packet data 1 and 2 are respectively applied to the data transmission paths 30 and 60, packet data late in being inputted is temporarily stopped by the flip-flop in the preceding stage comprising the NAND gates 81 and 82 and the flip-flop in the succeeding stage comprising the NAND gates 83 and 84.

Then, it is assumed that packet data are continuously inputted to both transmission paths so that the packet data stay int he transmission paths.

First, in a state immediately before the packet data stay, while the "L" level transmission signal C101 is applied to the transfer control portion 101 from the transfer control portion 62 and the packet data 2 is transmitted to the data holding circuit 102 from the data holding circuit 62, the output of the NAND gate 83 becomes the "H" level and the output of the NAND gate 84 becomes the "L" level, so that the flip-flop in the succeeding stage is stabilized.

In this state, if the stay of packet data is made, words of packet data respectively exist in the data transmission paths 30 and 60. In this case, the output of the NAND gate 92 becomes the "L" level and the output of the NAND gate 91 becomes the "H" level. Therefore, the output of the NAND gate 81 is set to the "H" level and the output of the NAND gate 82 is held at the "H" level. Thus, the flip-flop in the succeeding stage is held in the previous state.

Additionally, when the packet data stay immediately after the "L" level transmission signal C102 is applied to the transfer control portion 101 from the transfer control portion 61 and words of the packet data 2 are transmitted to the data holding circuit 102 from the data holding circuit 62, the outputs of the NAND gates 83 and 84 in the flip-flop in the succeeding stage are held in the previous state, as in the embodiment shown in FIG. 2.

Thus, the transfer control portion 61 remains authorized to transmit packet data, and the transfer control portion 31 remains inhibited from transmitting packet data. Therefore, this state is preserved until the stay of packet data in the data transmission path 60 given priority is decreased.

then, when the packet data stay while the "L" level transmission signal C101 is applied to the transfer control portion 101 from the transfer control portion 31 and the packet data 1 is transmitted to the data holding circuit 102 from the data holding circuit 32, the outputs of the NAND gates 83 and 84 of the flip-flop in the succeeding stage are held, as in the embodiment shown in FIG. 2. Thus, after transmission of packet data from the data transmission path 32 to the data transmission path 102 is completed which is authorized at the present time point, transmission of packet data by the transfer control portion 31 is inhibited while transmission of packet data by the transfer control portion 61 is authorized.

Thus, the arbitration control portion 80 keeps authorizing the transfer control portion 61 to transmit packet data while inhibiting the transfer control portion 31 from transmitting packet data.

Additionally, if and when packet data stay immediately after transmission of packet data by the transfer control portions 31 is completed, the transfer control portion 31 is inhibited from transmitting data while the transfer control portion 61 is authorized to transmit packet data, as described above. More specifically, this state is preserved until the stay of the packet data in the data transmission path 60 given priority is decreased.

Thus, if and when the stay of packet data is made, the arbitration control portion 80 functions such that the stay of packet data in a data transmission path given priority, i.e., the data transmission path 60 comprising the transfer control portion 61 and the data holding circuit 62 is decreased.

As described in the forgoing, according to the present invention, when only the packet data 1 exist and the packet data 2 do not exist in a state in which the output-side data transmission path 100 is empty, the packet data 1 are sequentially outputted. In addition, when only the packet data 2 exist and the packet data 1 do not exist, the packet data 2 are sequentially outputted.

On the other hand, when the packet data 1 and 2 are transmitted with the maximum transfer capability of each of the input-side transmission paths, the data transmission path 100 cannot simultaneously process the packet data. Therefore, the packet data stay in the data transmission paths 30, 20 and 10 and 60, 50 and 40. In this case, the arbitration control portion 80 functions such that the packet data in the data transmission path 60 is transmitted to the data transmission path 100 by priority so that the stay of packet data in the transmission path given priority is decreased.

Additionally, if and when packet data do not stay in the data transmission paths 60, 50 and 40 given priority, the packet data is transmitted to the data transmission path 100 in the order in which packet data arrives at the data transmission paths 30 and 60.

Figure 9:
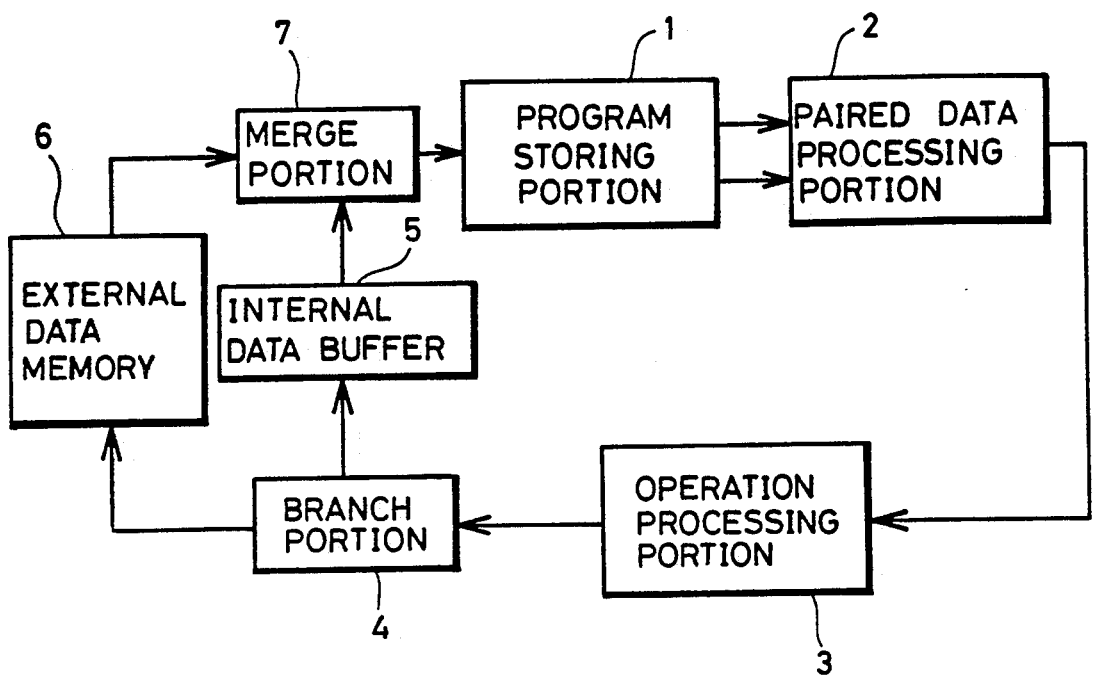
FIG. 9 is a block diagram showing a structure of a data flow type information processor to which the data transmission apparatus according to the present invention is applied.

The data transmission apparatus in the above described embodiment is applied to, for example, a data flow type information processor. FIG. 9 is a block diagram showing one example of a structure of the data flow type information processor, and FIG. 10 is a diagram showing one example of a field structure of a data packet processed by the information processor.

Figure 10:
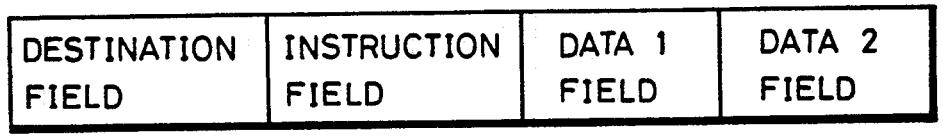
FIG. 10 is a diagram showing a data packet circulating through portions of the data flow type information processor shown in FIG. 9.

Referring FIG. 9 and 10, description is made on a structure of the data flow type information processor and a schematic operation thereof. A data packet shown in FIG. 10 comprises a destination field, an instruction field, a data 1 field and a data 2 field. The destination field stores destination information, the instruction field stores instruction information, and the data 2 field or the data 2 field stores operand data.

Figure 11:
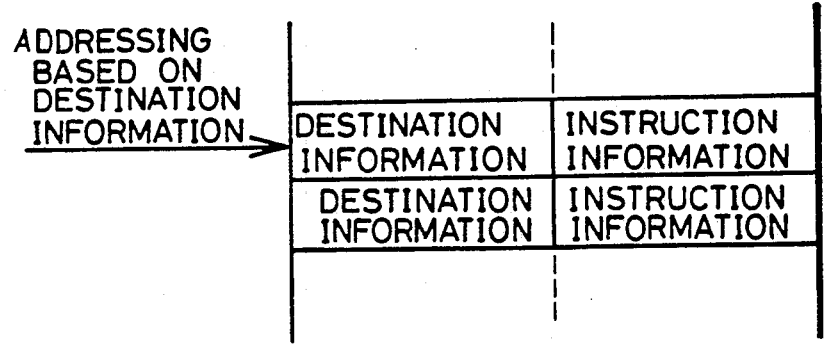
FIG. 11 is a diagram showing a data flow program stored in a program storing portion of the data flow type information processor shown in FIG. 9.

In FIG. 9, a program storing portion 1 comprises a program memory (not shown), a data flow program comprising destination information and instruction information being stored int he program memory, as shown in FIG. 11. The program storing portion 1 reads out destination information and instruction information by addressing based on the destination information in the data packet, stores the information in the destination field and the instruction field of the data packet, respectively, and outputs the data packet.

A paired data detecting portion 2 queues data packets outputted from the program storing portion 1. More specifically, the paired detecting portion 2 detects the two data packets having the same destination information, stores operand data of one of the data packets in a predetermined data field of the other data packet, and outputs the other data packet. On this occasion, the above described one data packet disappears. An operation processing portion 3 decodes instruction information in the data packet outputted from the paired data detecting portion 2, performs predetermined operation processing with respect to two operand data of the data packet, stores the result of operation processing in the data field of the data packet, and output the data packet to a blanch portion 4.

The blanch portion 4 outputs the data packets to an internal data buffer 5 or an external data memory 6 based on the destination information of the data packet. The data packets outputted from the internal data buffer 5 and the external data memory 6 are applied to a merge portion 7. The merger portion 7 applies the data packets to the program storing portion 1 in the order of arrival or in the order of priority.

The data flow type information processor shown in FIG. 9, the data packet circulates through the program storing portion 1, the paired data detecting portion 2, the operation processing portion 3, the blanch portion 4, the internal data buffer 5 or the external data memory 6 and the merge portion 7, so that operation processing based on the program stored in the program storing portion 1 progresses.

The data transmission apparatus according to the above described embodiment can be used as the merge portion 7 of the data flow type information processor shown in FIG. 9. The data transmission apparatus shown in FIGS. 1 and 2 is used when the data packet shown FIG. 10 comprises one word, while the data transmission apparatus shown in FIGS. 7 and 8 is used when the data packet shown in FIG. 10 comprises two words.

It should be noted that the data transmission apparatus according to the present invention is not limited to the data flow type information processor. For example, the data transmission apparatus can be widely used for other apparatuses requiring data transmission such as various information processors. Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmission apparatus for sending out to a succeeding stage in series a plurality of data applied from a preceding stage, comprising:
   a plurality of single direction first data transmission paths receiving the plurality of data applied from said preceding stage, priorities being respectively given to the plurality of single direction first data transmission paths,
   a second data transmission path selectively receiving data from any one of said plurality of first data transmission paths for outputting the data to said succeeding stage, and
   control means for controlling the priority of data transmitted from said plurality of first transmission paths to said second data transmission path so that when each of said plurality of transmission paths simultaneously receive data for transmission to said second data transmission path the data from said plurality of transmission paths will be forwarded to said second transmission path in order of said priority.

2. The data transmission apparatus according to claim 1, wherein
   said control means, controls the transmission of data from said plurality of first transmission paths to said second data transmission path based on priority related to the time of storage of said data in said plurality of first transmission paths.

3. The data transmission path according to claim 1, wherein
   each of said plurality of first data transmission paths generates a transmission inhibiting signal indicating that data cannot be received when it receives data,
   said second data transmission path generates a transmission authorizing signal indicating that data can be received when it does not receive data, and
   said control means is responsive to reception of said transmission authorizing signal from said second data transmission path and reception of said transmission inhibiting signal from said one first data transmission path out of said plurality of first data transmission paths for applying a transmission authorizing signal to said one first data transmission path.

4. The data transmission apparatus according to claim 3, wherein
   said control means is responsive to simultaneous reception of said transmission authorizing signal from said second transmission path and simultaneous reception of said transmission inhibiting signals from a plurality of first data transmission paths out of said plurality of first data transmission paths for applying said transmission authorizing signal to said first data transmission path having the higher priority.

5. The data transmission apparatus according to claim 4, wherein
   said preceding stage outputs a transmission signal in data transmission, said succeeding stage outputs a transmission authorizing signal when data can be received, each of said plurality of first data transmission paths comprises first transfer control means responsive to reception of said transmission signal from said preceding stage and reception of said transmission authorizing signal from said control means for outputting a transmission signal and applying to said preceding stage a transmission inhibiting signal indicating that data cannot be received, and first data holding means responsive to said transmission signal from said first transfer control means for holding data received from said preceding stage and outputting the same, said second data transmission path comprises second transfer control means responsive to reception of said transmission signal from one first data transmission path out of said plurality of first data transmission paths and reception of said transmission authorizing signal from said succeeding stage for outputting a transmission signal and applying to said control means a transmission inhibiting signal indicating that data cannot be received, and second data holding means is responsive to said transmission signal from said second transfer control means for holding data received from said one first data transmission path out of said plurality of first data transmission paths and outputting the same.

6. The data transmission apparatus according to claim 5, wherein each of said plurality of first data transmission paths generates a transmission authorizing signal indicating that data can be received when it does not receive data, and said control means is responsive to reception of said transmission inhibiting signal from on first data transmission path out of said plurality of first data transmission paths and reception of said transmission authorizing signal from the other first data transmission paths out of said plurality of first data transmission paths for applying said transmission authorizing signal to said one first data transmission path; preserve the previous state in response to simultaneous reception of said transmission inhibiting signals from plurality of first data transmission paths out of said plurality of first data transmission paths; and preserve the previous state in response to reception of said transmission authorizing signal from one first data transmission path out of said plurality of first data transmission paths, reception of said transmission inhibiting signal from the other first data transmission paths out of said plurality of first data transmission paths, and application of said transmission signal to said first data transmission path having the higher priority from said preceding stage.

7. The data transmission apparatus according to claim 1, wherein each of said data is packet data comprising a plurality of words continuously transmitted, and said control means performs control for transmission in units of said packet data.

8. A data transmission apparatus for sending out to a succeeding stage in series a plurality of packet data applied from a preceding stage, each of said plurality of packet data comprising a plurality of words continuously transmitted, which comprises:

a plurality of first single direction data transmission paths receiving a plurality of packet data applied from said preceding stage, priorities being respectively given to the plurality of single direction first data transmission paths, a second transmission path selectively receiving packet data from any one of said plurality of first data transmission paths, and control means for controlling the priority of packet data transmitted from said plurality of first transmission paths to said second data transmission path so that the plurality of words are continuously transmitted to said second transmission path based on a priority of higher order between each of said plurality of transmission paths.

9. The data transmission apparatus according to claim 8, wherein said control means comprises word counting means for counting the number of words passing through each of said plurality of first data transmission paths, and performs control of transmission in units of packet data based on the number of words obtained by said word counting means.

10. A data transmission apparatus, used in a data flow type information processor for performing data processing in accordance with a data flow program for sending out to a succeeding stage in series a plurality of data applied from a preceding stage, comprising:

a plurality of first single direction data transmission paths receiving a plurality of data applied from said preceding stage, priorities being respectively given to the plurality of single direction first data transmission paths, a second data transmission output path selectively receiving data from any one of said plurality of first data transmission paths for outputting the data to said succeeding stage, and control means for controlling the priority of data transmitted from said plurality of first transmission paths to said second data transmission path so that when each of said plurality of transmission paths simultaneously receive data for transmission to said second data transmission path the data from said plurality of transmission paths will be forwarded to said second transmission path in order of said priority.

11. The apparatus of claim 1 wherein each of said plurality of single direction first data transmission paths includes a plurality of discrete data transmission paths operatively connected together and wherein said second data transmission path is a single data transmission path.

12. The apparatus of claim 1 wherein said priority is based on arrival time of data.

13. The apparatus of claim 1 wherein said plurality of single direction first data transmission paths are input transmission paths an said second data transmission path is an output transmission path.

14. The apparatus of claim 1 wherein said control means is an arbitration control means.

15. The apparatus of claim 8 wherein each of said plurality of single direction first data transmission paths includes a plurality of discrete data transmission paths operatively connected together and wherein said second data transmission path is a single data transmission path.

16. The apparatus of claim 8 wherein said plurality of single direction first data transmission paths are input transmission paths and said second data transmission path is an output transmission path.

17. The apparatus of claim 8 wherein said control means is an arbitration control means.

18. The apparatus of claim 10 wherein each of said plurality of single direction first data transmission paths includes a plurality of discrete data transmission paths operatively connected together and wherein said second data transmission path is a single data transmission path.

19. The apparatus of claim 10 wherein said plurality of single direction first data transmission paths are input transmission paths and said second data transmission path is an output transmission.

20. The apparatus of claim 10 wherein said control means is an arbitration control means.

* * * * *